United States Patent
Hu et al.

(10) Patent No.: US 8,630,599 B2
(45) Date of Patent: Jan. 14, 2014

(54) DISCOVERY OF SAFETY AND NON-SAFETY CAPABLE SINGLE-RADIO DEVICES IN WIRELESS ENVIRONMENTS

(75) Inventors: Wendong Hu, San Jose, CA (US); George A. Vlantis, Sunnyvale, CA (US)

(73) Assignee: STMicroelectronics, Inc., Coppell, TX (US)

(*) Notice: Subject to any disclaimer, the term of this patent is extended or adjusted under 35 U.S.C. 154(b) by 136 days.

(21) Appl. No.: 13/044,170

(22) Filed: Mar. 9, 2011
(Under 37 CFR 1.47)

(65) Prior Publication Data

US 2011/0294447 A1     Dec. 1, 2011

Related U.S. Application Data

(60) Provisional application No. 61/312,150, filed on Mar. 9, 2010, provisional application No. 61/312,157, filed on Mar. 9, 2010, provisional application No. 61/312,145, filed on Mar. 9, 2010.

(51) Int. Cl.
*H04B 1/18*     (2006.01)

(52) U.S. Cl.
USPC ......... 455/154.1; 455/41.2; 455/62; 370/229; 370/252

(58) Field of Classification Search
USPC ............ 455/41.2, 62, 67.11, 154.1; 370/229, 370/252
See application file for complete search history.

(56) References Cited

U.S. PATENT DOCUMENTS

| 7,813,371 | B2 | 10/2010 | McNew et al. | |
| 8,086,872 | B2* | 12/2011 | Kim et al. | 713/191 |
| 2009/0138197 | A1* | 5/2009 | Laberteaux et al. | 701/213 |

* cited by examiner

*Primary Examiner* — Tuan H Nguyen
(74) *Attorney, Agent, or Firm* — Hogan Lovells US LLP

(57) ABSTRACT

Discovery of safety and non-safety capable single-radio devices in vehicular wireless environments is made possible through the use a two-bit indicator. A first indicator is associated with a type C device. A second indicator is associated with a non-type C device within one hop of a type C device. A third indicator is associated with a non-type C device within two hops of a type C device. A fourth indicator is associated with a non-type C device within three hops or more (out of range) of a type C device. Discovery of safety and non-safety capable single-radio vehicular devices within a protection range in multiple-channel based wireless vehicular environments is thus made possible.

18 Claims, 15 Drawing Sheets

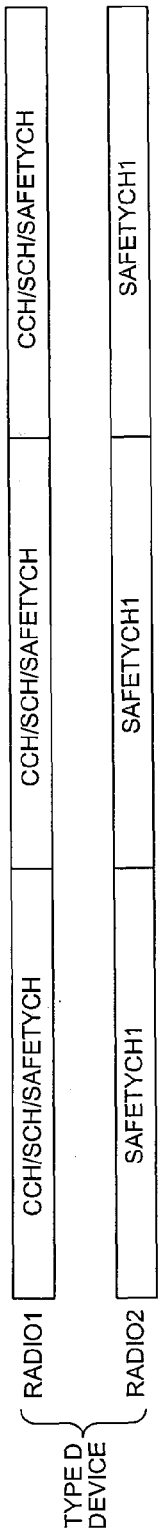

CASE 1 - ALL TYPE A DEVICES (OK)

| DEVICE 1 | CCH | SCH1 | CCH | SCH2 | CCH | SAFETYCH1 |
| DEVICE 2 | CCH | SCH1 | CCH | SCH2 | CCH | SAFETYCH1 |

Fig. 4

CASE 2 - ALL TYPE B DEVICES (OK)

| DEVICE 1 | SAFETYCH1 | SAFETYCH1 |
| DEVICE 2 | SAFETYCH1 | SAFETYCH1 |

Fig. 5

CASE 3 - MIXTURE OF TYPE A AND B DEVICES (PROBLEMATIC)

| TYPE A DEVICE | CCH | SCH1 | CCH | SCH2 | CCH | SAFETYCH1 |
| TYPE B DEVICE | SAFETYCH1 | SAFETYCH1 |

Fig. 6

CASE 1 - ONLY TYPE C DEVICES ARE IN RANGE (OK)

| TYPE C DEVICE 1 | CCH → SCH | SAFETYCH | CCH/SCH/SAFETYCH | SAFETYCH | CCH/SCH/SAFETYCH | SAFETYCH |
|---|---|---|---|---|---|---|

| TYPE C DEVICE 2 | CCH → SCH | SAFETYCH | CCH/SCH/SAFETYCH | SAFETYCH | CCH/SCH/SAFETYCH | SAFETYCH |
|---|---|---|---|---|---|---|

*Fig. 11*

CASE 2 - ONLY TYPE B DEVICES ARE IN RANGE (OK)

| DEVICE 1 | SAFETYCH1 | SAFETYCH1 |
|---|---|---|

| DEVICE 2 | SAFETYCH1 | SAFETYCH1 |
|---|---|---|

*Fig. 12*

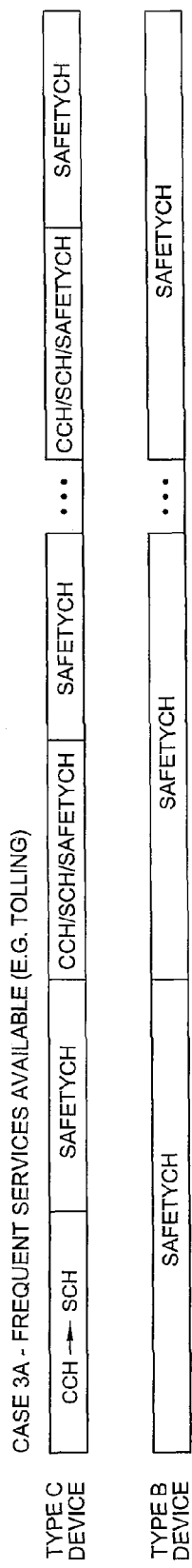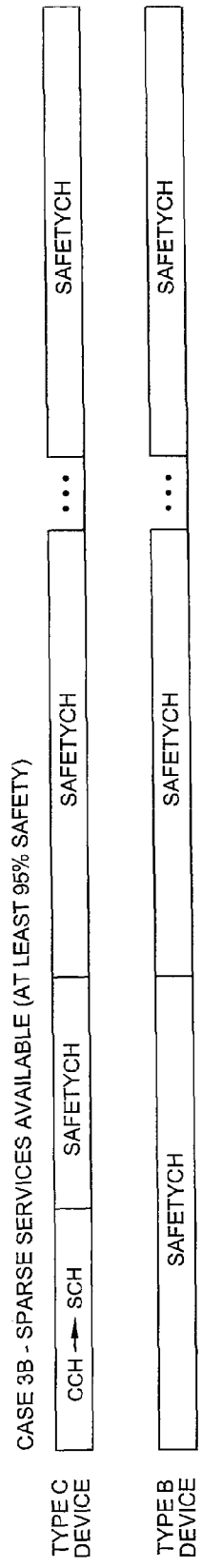
Fig. 13
Fig. 14

DISCOVERY OF SAFETY AND NON-SAFETY CAPABLE SINGLE-RADIO DEVICES IN WIRELESS ENVIRONMENTS

This application claims the benefit of U.S. Provisional Patent Applications Nos. 61/312,157, 61/312,150 and 61/312,145, filed on Mar. 9, 2010, which are all hereby incorporated by reference for all purposes as if fully set forth herein. The present application relates to co-pending U.S. patent application Ser. No. 13/044,205, filed on even date herewith, entitled, "OPERATION PROCEDURES FOR INTEROPERABLE SAFETY AND NON-SAFETY COMMUNICATIONS IN WIRELESS ENVIRONMENTS"; and co-pending U.S. patent application Ser. No. 13/044,227, filed on even date herewith, entitled, "CHANNEL SWITCHING FOR INTEROPERABLE SAFETY AND NON-SAFETY COMMUNICATIONS IN WIRELESS ENVIRONMENTS". These applications are incorporated herein by reference in their entirety.

BACKGROUND OF THE INVENTION

1. Field of the Invention

The invention relates, in general, to wireless systems and more particularly to channel switching for interoperable safety and non-safety communications in wireless environments.

2. Discussion of the Related Art

The 5.9 GHz DSRC ("Dedicated Short Range Communications") spectrum allocation is shown in FIG. 1. Channels 172, 174, 176, 178, 180, 182, and 184 are shown in FIG. 1. Notably, a control channel is found on channel 178, service channels are found on channels 174 and 176, and safety channels are found on channel 172 and 184. FCC Memorandum Opinion and Order FCC-06-110 contains further information about the spectrum allocation.

Notably, FCC-06-110 mandates that channel 172 is designated for public safety applications involving safety of life and property.

FCC-060-110 also mandates that channel 184 is designated for public safety applications involving safety of life and property. Only those entities meeting the requirements of FCC 90.373(a) are eligible to hold an authorization to operate on this channel.

IEEE 802.11p is an approved amendment to the IEEE 802.11 standard to add wireless access in vehicular environments (WAVE). It defines enhancements to 802.11 required to support Intelligent Transportation Systems (ITS) applications. This includes data exchange between high-speed vehicles and between the vehicles and the roadside infrastructure in the licensed ITS band of 5.9 GHz (5.85-5.925 GHz). IEEE 1609 is a higher layer standard on which IEEE 802.11p is based.

A proposed requirement for WAVE multi-channel interoperability is explained below. WAVE multi-channel operations shall be scheduled in a way that ensures interoperable communications among a mixture of various WAVE devices for both safety and non-safety applications conducted on the safety channels and the non-safety channels, respectively.

Typical WAVE device types operating on the safety channels is described below with reference to FIGS. 2 and 3. In FIG. 2, the operation of single-PHY (physical layer) devices is shown. A first type of single-PHY device operation is shown in FIG. 2A. Type A devices are CCH-SCH-Switching devices (control channel, service channel). In FIG. 2A the control channel CCH is interleaved with service channels SCH1 and SCH2. A second type of single-PHY device operation is shown in FIG. 2B. Type B devices are Safety-Channel-only devices. Note that the device is only tuned to safety channel SafetyCH1. In FIG. 3, the operation of dual or multi-PHY (physical layer) devices is shown. Type D devices have, for example, two radios that are both channel switching capable. Radio 1 switches between control channels and safety channels, whereas radio 2 is tuned to the safety channel.

The interoperability of various single-PHY WAVE devices on the safety channel is shown below with reference to FIGS. 4-6.

Case 1 is shown in FIG. 4 wherein Device 1 and Device 2 are both type A devices. There is no problem with this case, as the type A devices are compatible having similar switching between the safety and control channels as shown.

Case 2 is shown in FIG. 5 wherein Device 1 and Device 2 are both type B devices. There is no problem with this case either, as the type B devices are both tuned to the safety channel, SafetyCH1.

Case 3 shows a mixture of type A and B devices, which is problematic. This is obviously due to the fact that the type A device switches between the control and service channels, whereas the type B device is tuned to the safety channel SafetyCH1.

The operation of typical WAVE device types on the non-safety channels is shown below with reference to FIG. 7. WAVE devices only for non-safety services (e.g. tolling), are herein called type "T" devices. A type T (one-radio) Roadside Unit (RSU) switches synchronously to the CCH in order to transmit its WSA, and then after transmission switches asynchronously to the SCH to perform a service. The worst case is an asynchronous type T On-board Unit (OBU). The OBU is normally sleeping, and upon activation, tunes to the CCH, with no GPS. Upon receiving the WSA, switches to the SCH for conducting services. The OBU goes back to sleep after services are completed.

Hence, there remains a need for improved interoperability for safety and non-safety communications in wireless environments.

SUMMARY OF THE INVENTION

According to the present invention, discovery of safety and non-safety capable single-radio devices in vehicular wireless environments is made possible through the use of a two-bit indicator. A first indicator is associated with a type C device. A second indicator is associated with a non-type C device within one hop of a type C device. A third indicator is associated with a non-type C device within two hops of a type C device. A fourth indicator is associated with a non-type C device within three hops or more (out of range) of a type C device. Discovery of safety and non-safety capable single-radio devices within a protection range in multiple-channel base wireless vehicular environments is thus made possible.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings:

FIG. 2 is a diagram illustrating typical WAVE device types operating on the safety channel, wherein FIG. 2A shows a single-PHY device having CCH-SCH switching, and FIG. 2B shows a single-PHY device having safety channel only operation;

FIG. 3 is a diagram illustrating the performance of a dual-PHY device having two radios, wherein both radios are channel switching capable;

FIG. 4 is a diagram illustrating the interoperability of various single-PHY WAVE devices on the safety channel, wherein all type A devices are compatible;

FIG. 5 is a diagram illustrating the interoperability of various single-PHY WAVE devices on the safety channel, wherein all type B devices are compatible;

FIG. 6 is a diagram illustrating the interoperability of various single-PHY WAVE devices on the safety channel, wherein a mixture of type A and type B devices is problematic;

FIG. 11 is a diagram illustrating the interoperability of type C only devices;

FIG. 12 is a diagram illustrating the interoperability of type B only devices;

FIGS. 13 and 14 are diagrams illustrating the interoperability type C and type B devices;

DETAILED DESCRIPTION OF THE ILLUSTRATED EMBODIMENTS

Reference will now be made in detail to an embodiment of the present invention, examples of which are illustrated in the accompanying drawings.

Figure 1:
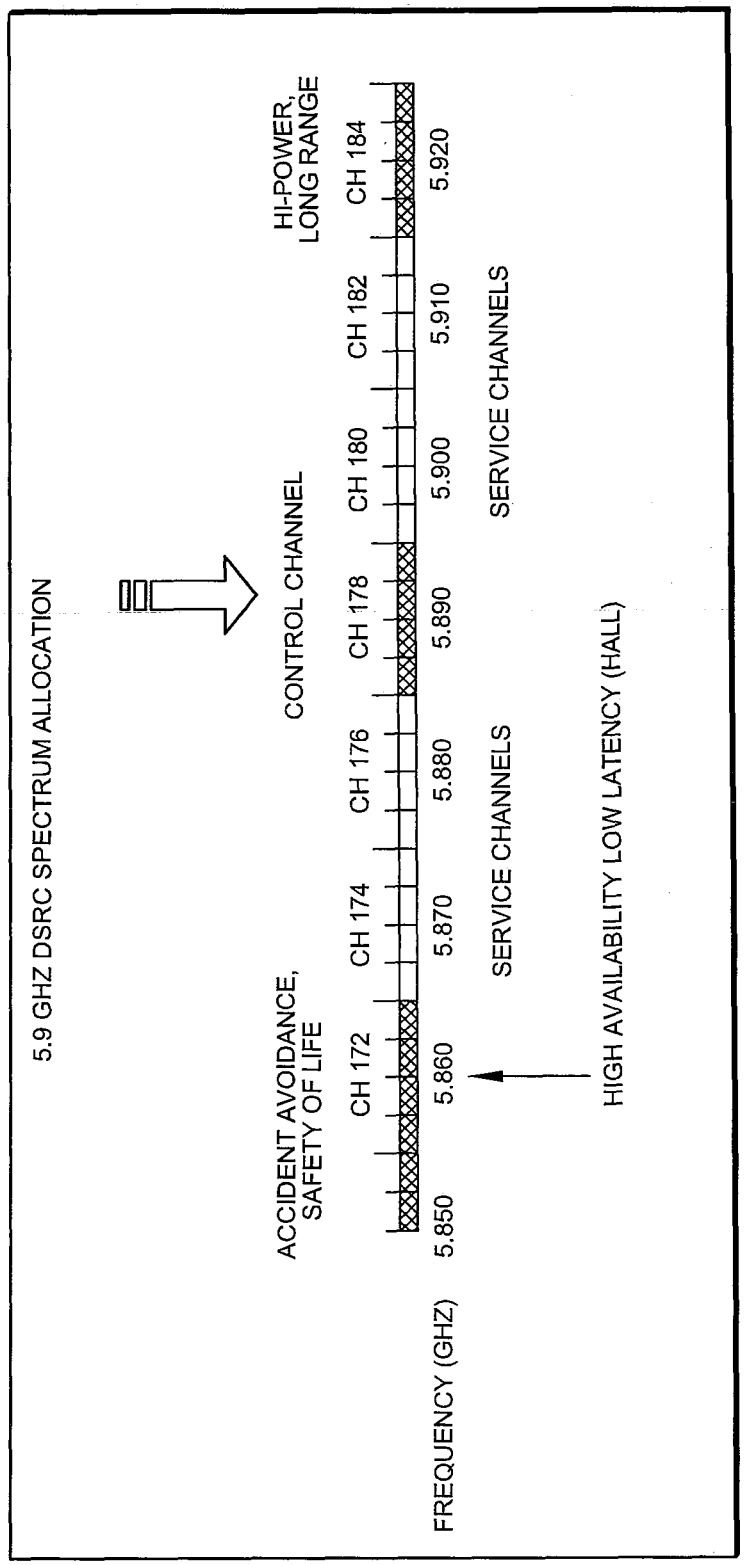
FIG. 1 is a diagram illustrating the 5.9 GHz DSRC spectrum allocation.
Figure 7:
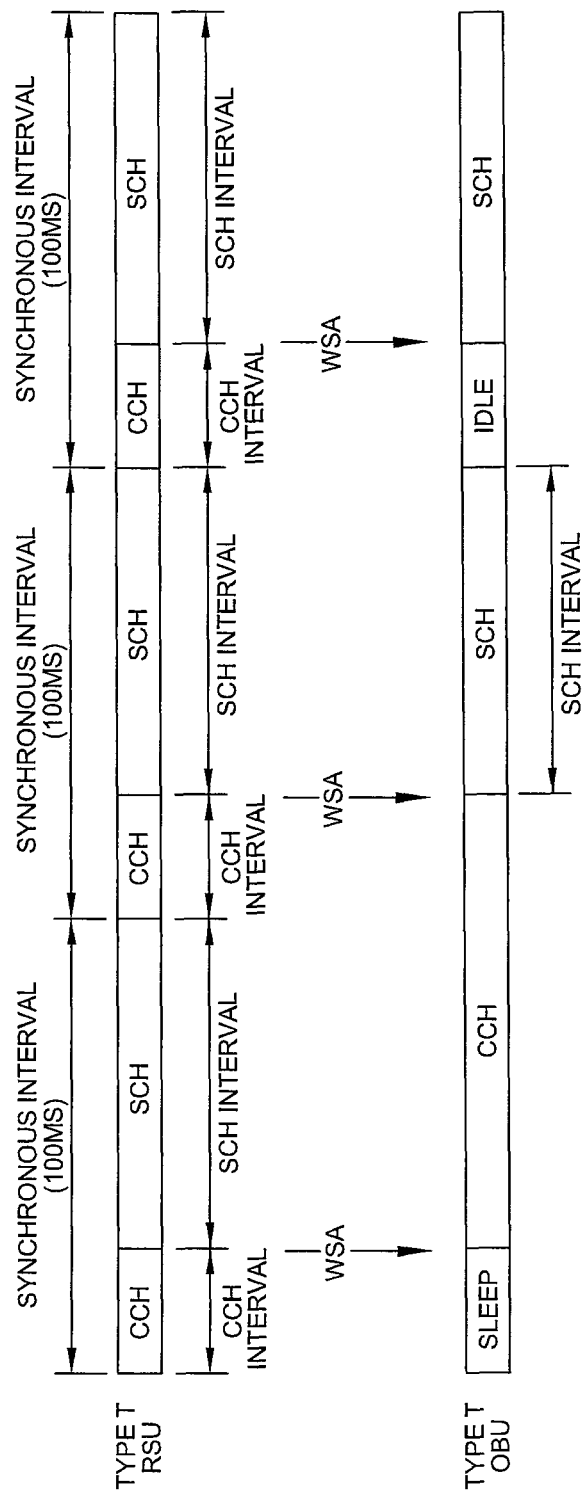
FIG. 7 is a diagram illustrating typical WAVE device types operating on the non-safety channels.
Figure 8:
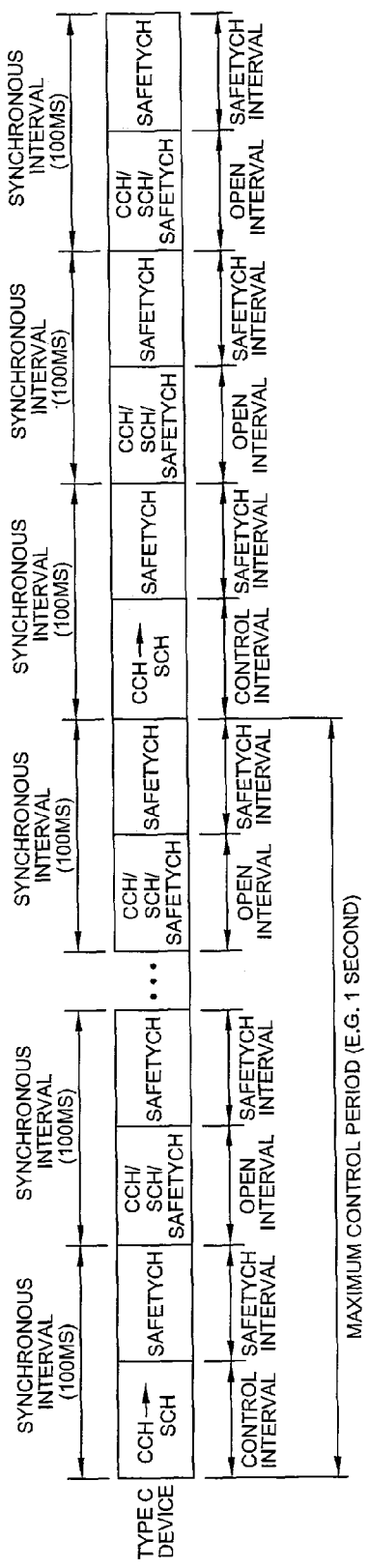
FIG. 8 is a diagram illustrating the operation of a type C single-PHY device according to the present invention.

A solution to the interoperability problem according to a first embodiment of the invention is described below with reference to FIG. 8. According to a first embodiment of the invention, a type C single-PHY device substitutes for the type A device described above. A synchronous interval is divided into a safety channel interval, dedicated for safety channel (e.g. channel 172) operations. An open interval is flexibly used for CCH and/or SCH and/or safety channel operations. A control interval is a special case of an open interval. The control internal is scheduled once per a maximum control interval (e.g. one second). The maximum control interval is made long enough to accommodate the maximum latency requirement of the supported services from an RSU (e.g. tolling). The control interval is dedicated for CCH communication of non-safety services, and optionally used for the SCH.

Figure 9:
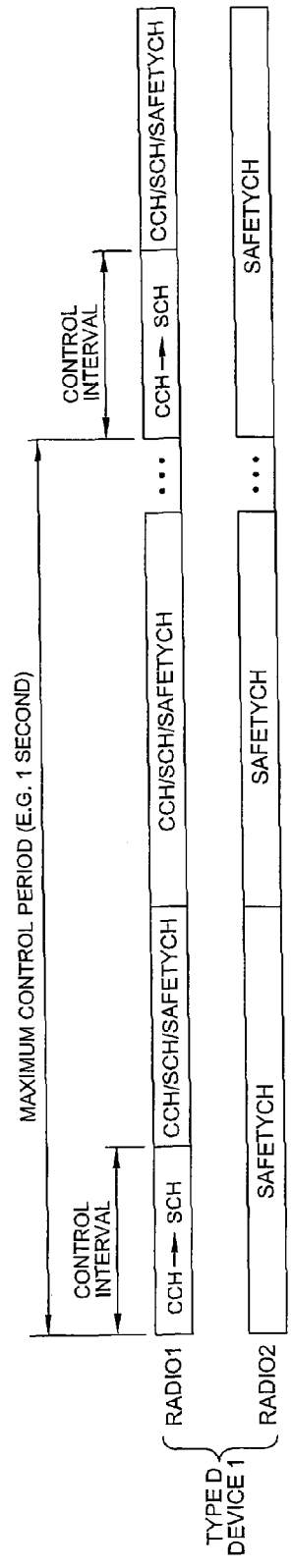
FIG. 9 is a diagram illustrating the operation of a type D dual or multi-PHY device according to the present invention.

A solution to the interoperability problem according to a second embodiment of the invention is described below with reference to FIG. 9. A control interval is scheduled per maximum control interval (e.g. one second) on one of the radios supporting non-safety services (e.g. tolling).

According to the present invention, several modifications are suggested to the IEEE standard. The synchronous interval should be modified and divided into a safety channel interval and an open interval instead of a CCH (control channel) interval and SCH (service channel) interval. For the single-radio device, a control interval, in place of an open interval should be scheduled at least once every maximum service scheduling period. Such a control interval is dedicated for CCH (and SCH) operation. For the multi-radio device, a control interval is scheduled at least once every maximum control interval on one of the radios support non-safety services (e.g. tolling).

Figure 10:
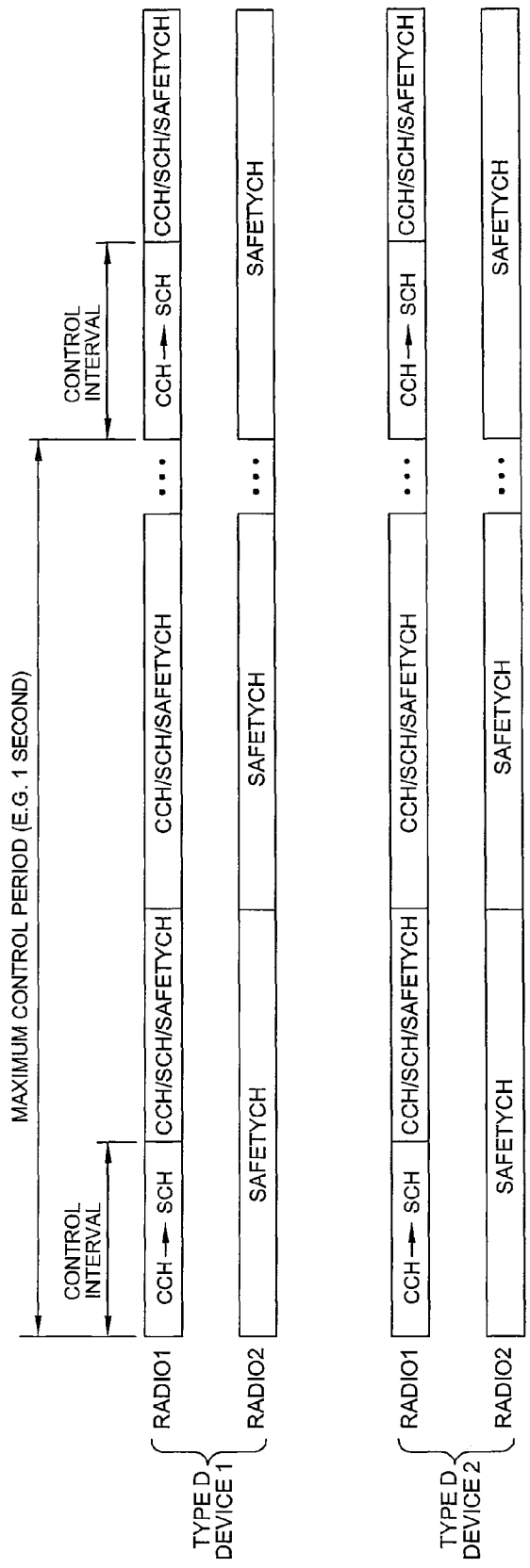
FIG. 10 is a diagram illustrating the operation of two type D dual or multi-PHY devices according to the present invention.

Interoperability of dual/multi-PHY WAVE devices of the safety channel and on the CCH is thus shown in FIG. 10, with two compatible type D devices, Device 1, and Device 2, each of which is described above with reference to FIG. 9.

The operational procedure for interoperable safety and non-safety communications is described in further detail below.

FIG. 11 shows a first case in which only type C devices are in range. Type C device 1 and type C device 2 are compatible as shown in FIG. 11.

FIG. 12 shows a second case in which only type B devices are in range. Device 1 and Device 2 are compatible as shown in FIG. 12.

FIG. 13 shows a third case having a mixture of type C and type B devices in range. FIG. 13 specifically shows the case in which frequent services such as tolling are available.

FIG. 14 also shows the third case having a mixture of type C and type B devices in range. FIG. 14 specifically shows the case in which sparse service is available (at least 95% safety).

Figure 15:
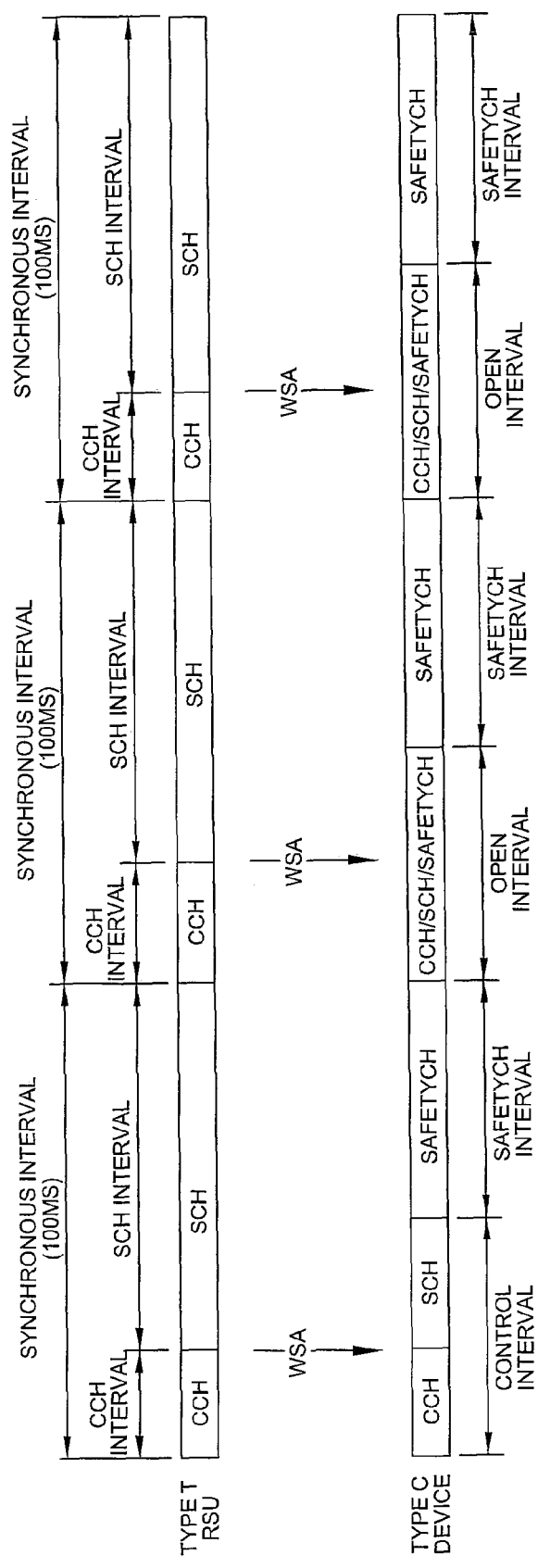
FIG. 15 is a diagram illustrating the interoperability between type C and type T RSU devices on the CCH.

FIG. 15 shows the interoperability between type C and type T RUS devices on the CCH. The type T RSU and type C device have been previously described. In addition, FIG. 15 also shows the location of a WSU exchanged between the type T RSU and the type C device. One concern regarding the interoperability of type T RSU and type C devices is that service may not complete with the dedicated service interval, because of multiple exchanges required to complete a financial transaction. Due to the type C device's safety constraint, the service should be continued on the SCH during the next open interval until the service is completed.

Figure 16:
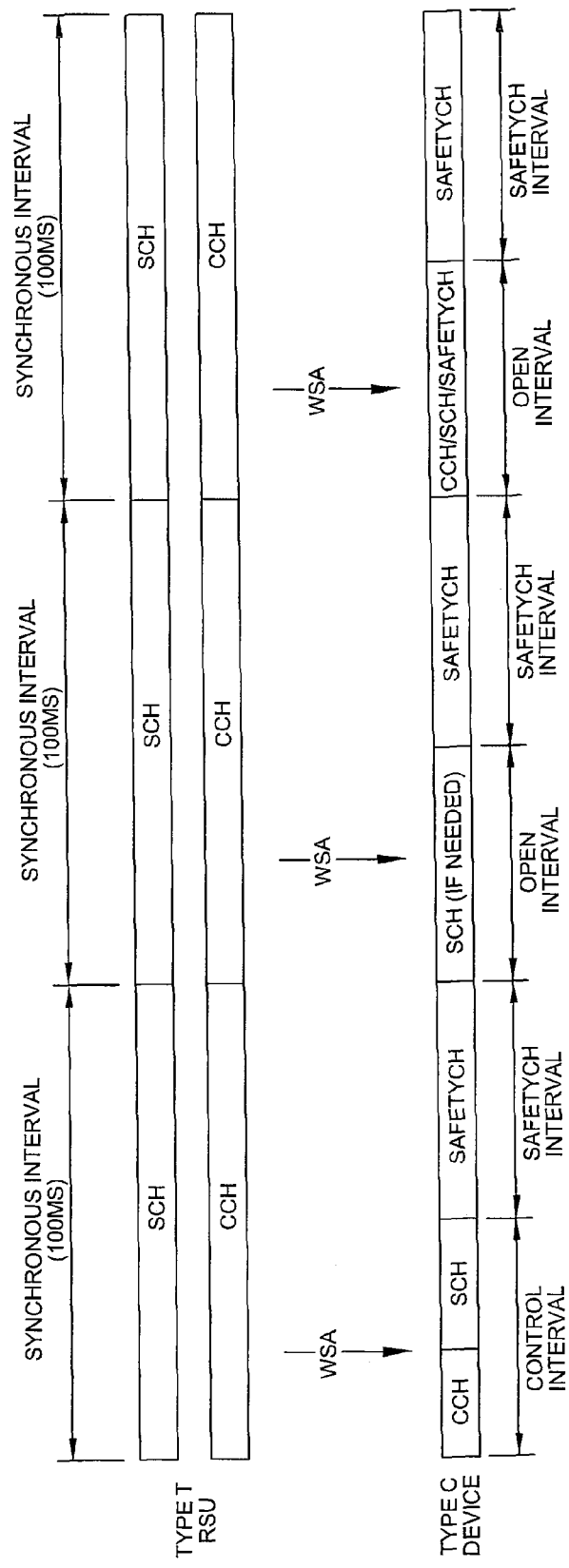
FIG. 16 is a diagram illustrating the interoperability between a type C device and a type T RSU having two radios respectively dedicated to CCH and SCH operation according to the present invention.

FIG. 16 illustrates a dual-radio type T RSU for improving services according to a first embodiment of the present invention. Two radios on a type T RSU are dedicated to the CCH and to the SCH, respectively. According to the present invention, the type C device may fully (instead of partially) use the next one or more open intervals to continue the yet-to-be-completed services. The WSA is transmitted to the type C device during each of the synchronous intervals as shown, each having a duration of about 100 milliseconds.

Figure 17:
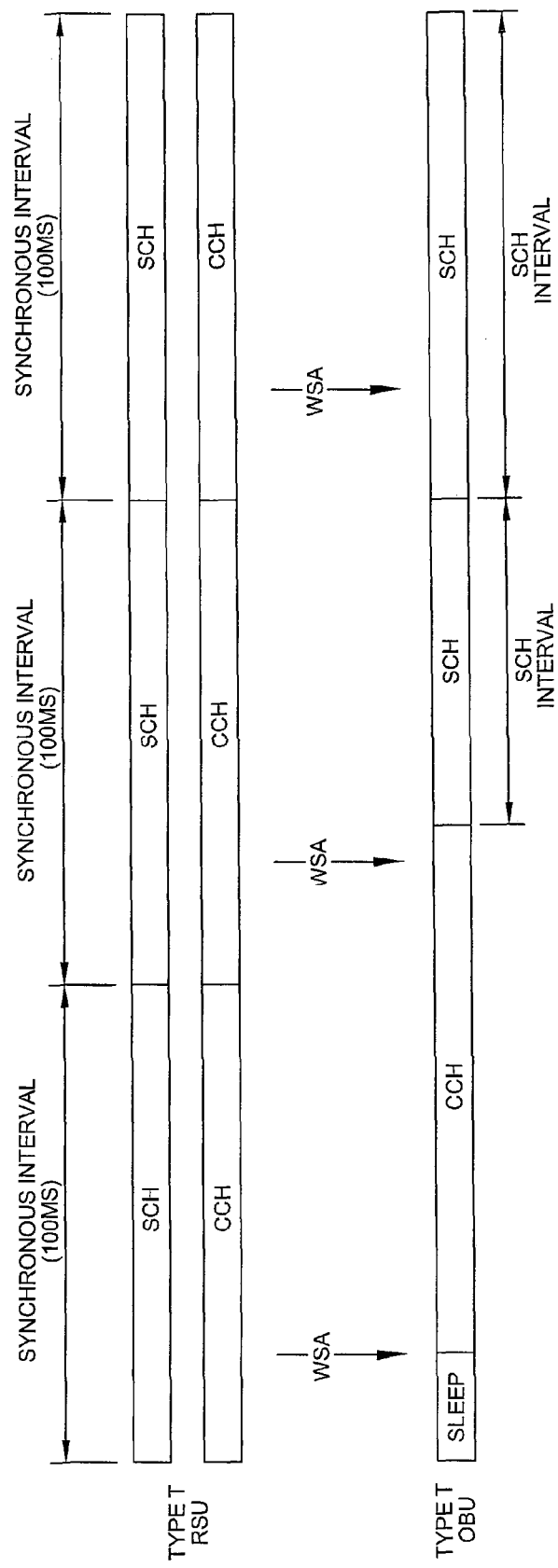
FIG. 17 is a diagram illustrating the interoperability between a type T RSU and a type T OBU according to the present invention.

FIG. 17 illustrates using a dual-radio type T RSU for improving services according to a second embodiment of the present invention. Two radios on a type T RSU are dedicated to the CCH and SCH, respectively, as in FIG. 16. Operating with a type T OBU, the dual-radio type T RSU can improve service performance as well. A type T OBU may utilize a full (rather than fractional) synchronous interval for services, with no idle. The WSA is transmitted to the type T OBU during each of the synchronous intervals as shown, each having a duration of about 100 milliseconds.

Figure 18:
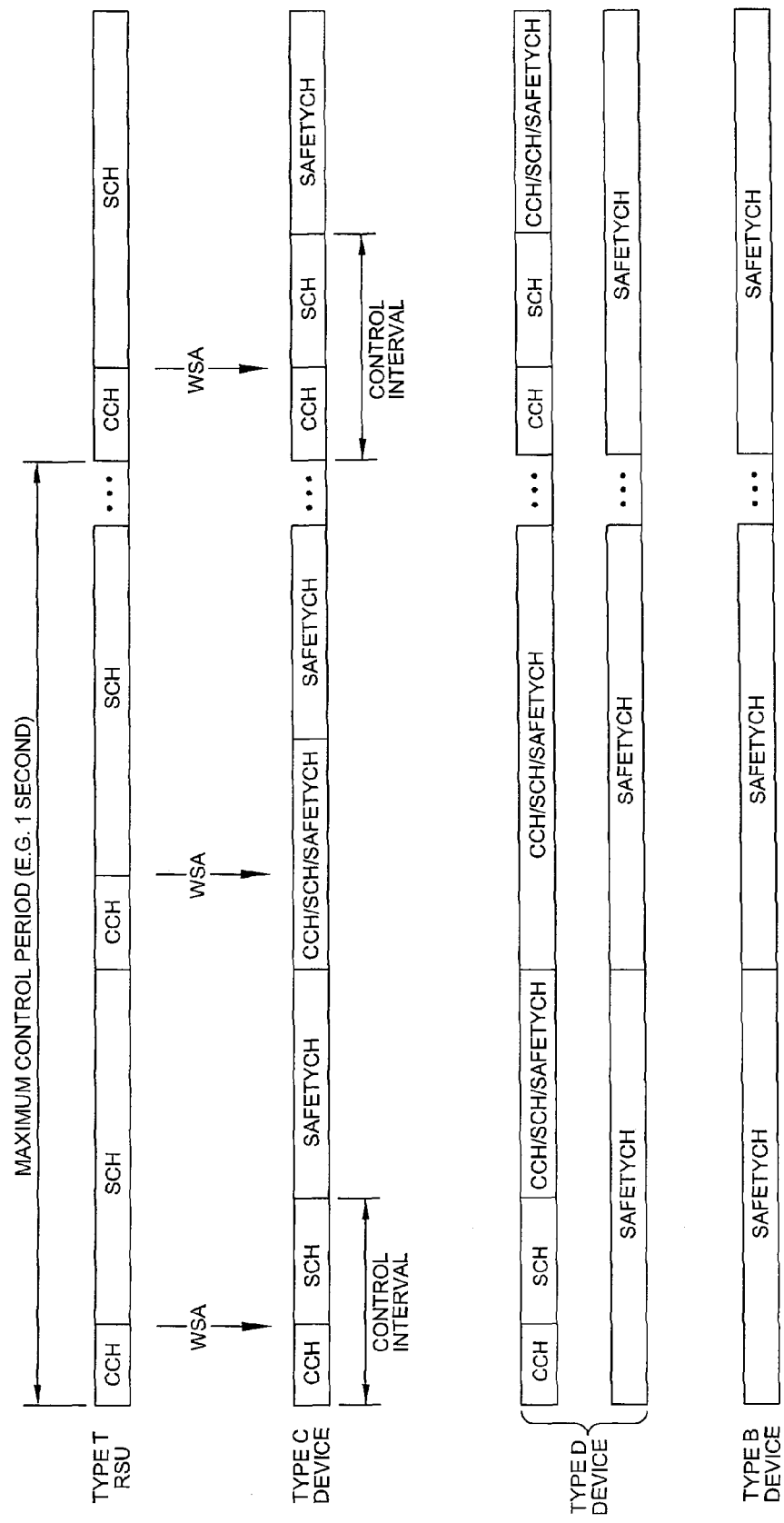
FIGS. 18 and 19 are diagrams showing interoperability of various WAVE devices on the safety channel and on the CCH according to the present invention.

FIG. 18 shows the interoperability of various WAVE devices on the safety channel and the control channel according to the present invention. Depicted in FIG. 18 is a type T RSU, a type C device, a type D device, and a type B device, all as previously described.

Figure 19:
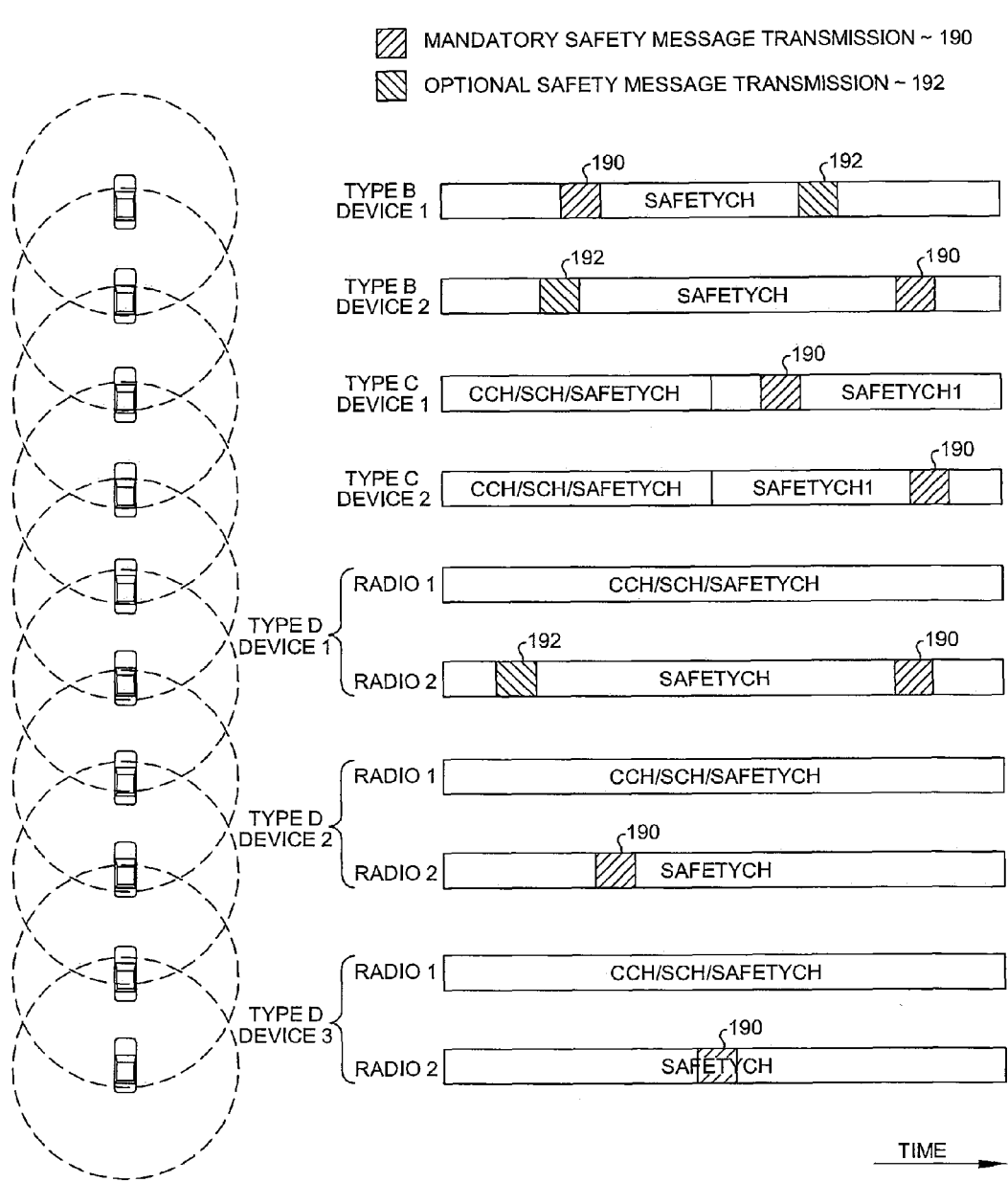

FIG. 19 shows the interoperability of various WAVE devices on the safety channel and the control channel according to the present invention. Depicted in FIG. 19 is a first type B device, a second type B device, a first type C device, a second type C device, a first type D device having first and second radios, a second type D device having first and second radios, and a third type D device having first and second radios.

In areas where non-safety devices are sparse, a type C device would function as a type B device, except for the one service interval per maximum service scheduling period to monitor the CCH for services. Only a type D device that has a one-hop neighboring type C device needs to adjust a safety message transmission to be performed during the SafetyCH interval, given that the open interval is used for non-safety applications.

According to a method of the present invention, discovery of safety and non-safety capable single-radio devices in wireless environments is made possible. The problem solved by the method of the present invention is that discovery of safety and non-safety capable single-radio vehicular devices within a protection range in multiple-channel based wireless vehicular environments is made possible. Without the method of the present invention, safety and non-safety capable single-radio vehicular devices within a protection range might not be effectively discovered.

Figure 20:
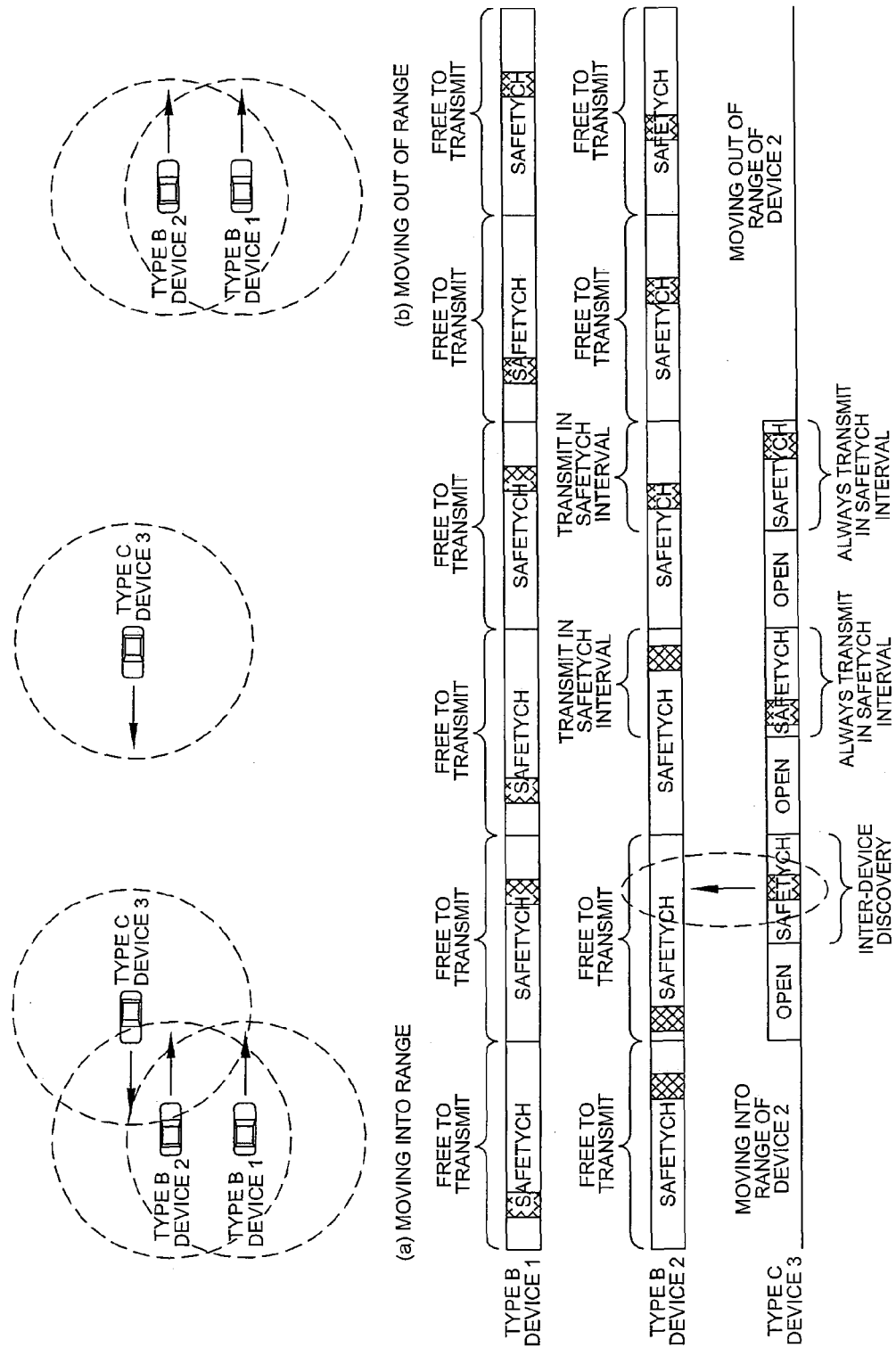
FIG. 20 is a diagram showing the discovery of type C vehicles.

Referring now to FIG. 20, in portion (a) of the figure a vehicular type B device 1 and a vehicular type B device 2 are shown moving into range of vehicular type C device 3. In portion (b) of the figure the vehicular type B device 1 and the vehicular type B device 2 are shown moving out of range of vehicular type C device 3. Type B device 1 is free to transmit in a plurality of safety channel intervals. Type B device 2 is also free to transmit in a plurality of safety channel intervals. Type C device 3 includes a plurality of interleaved open and safety channel intervals. Inter-device discovery between type B device 2 and type C device 3 is shown during an inter-device discovery period during the safety channel intervals.

Type C device indicator bits according to the method of the present invention are now described. Type C device indicator bits are used to enable the discovery of type C devices. The method of the present invention indicates the number of hops to a type C device. A zero value indicates a type C device (zero hop). A non-zero value indicates the minimum number of hops to a type C device. The value of "all-ones" indicates a type C device is not discovered or at a maximum distance.

Given a two-bit indicator field:
00: is a type C device;
01: not a type C device but is within one hop to a closest type C device;
10: not a type C device but is within two hops to a closest type C device;
11: not a type C device but is within three hops or more to a closet type C device.

According to the method of the present invention, indication with regard to a one-hop or multi-hop type C device allows a non-type-C device to give warnings to another non-type-C device in the proximity that a type-C device is likely approaching.

Figure 21:
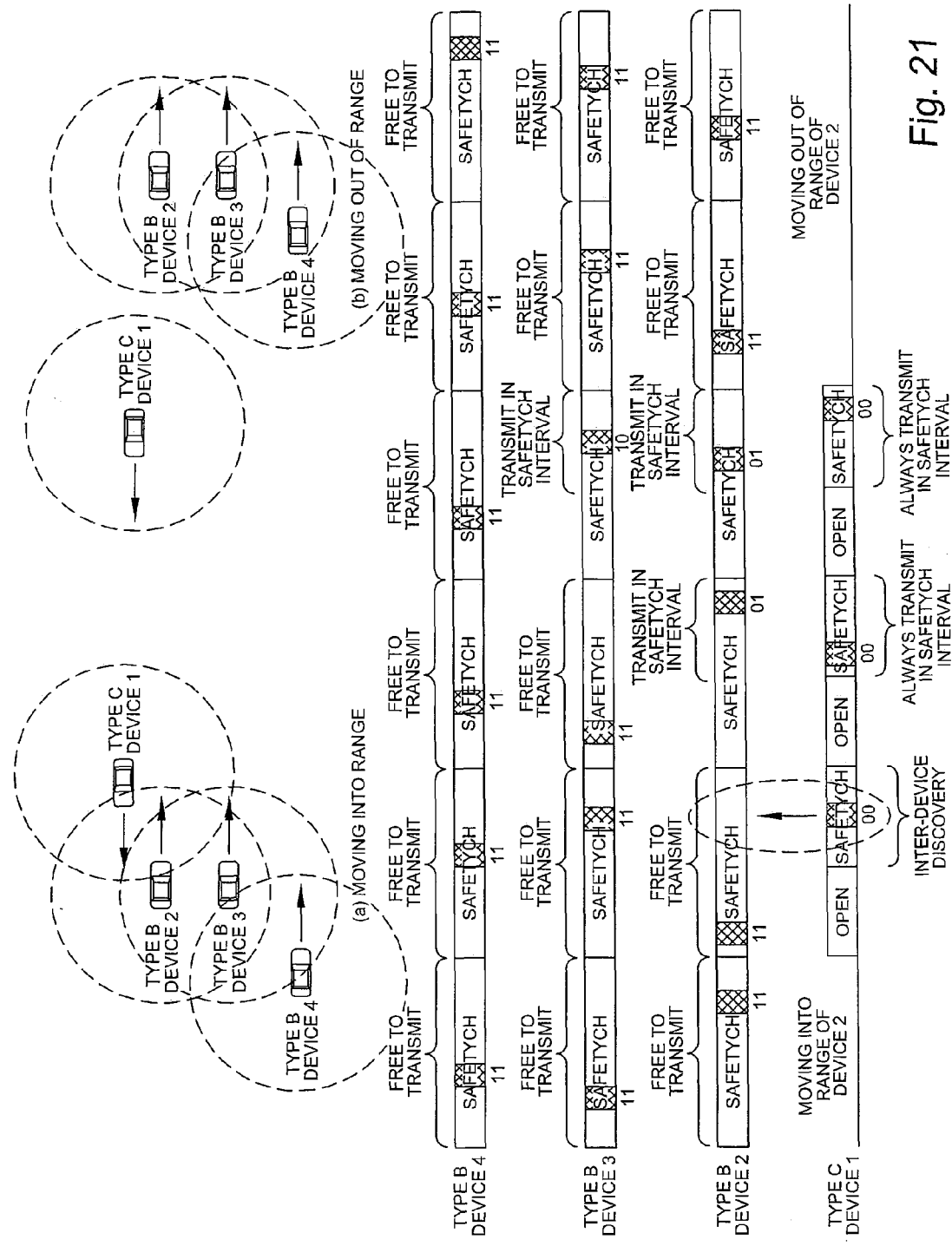
FIG. 21 is a diagram showing the discovery of type C vehicles using the device indicator bits according to the present invention.

Referring now to FIG. 21, in portion (a) of the figure a vehicular type B device 2, a vehicular type B device 3, and a vehicular type B device 4 are shown moving into range of vehicular type C device 1. In portion (b) of the figure the vehicular type B device 2, the vehicular type B device 3, and the vehicular type B device 4 are shown moving out of range of vehicular type C device 1. Type B device 4 is free to transmit in a plurality of safety channels intervals. Type B device 3 is free to transmit in a plurality of safety channel intervals. Type B device 2 is also free to transmit in a plurality of safety channel intervals. Type C device 1 includes a plurality of interleaved open and safety channel intervals. Inter-device discovery between type B device 2 and type C device 1 is shown during an inter-device discovery period during the safety channel intervals.

Note that in FIG. 21, each safety interval includes indicator bits that are used to enable the discovery of a type C device. Type C device 1 includes 00 indicator bits during the safety intervals indicating that it is a type C device. Type B device 2 includes 11 indicator bits when out of range of the type C device, and 01 indicator bits when within one hop range of the type C device. Type B device 3 includes 11 indicator bits when out of range of the type C device, and 10 indicator bits when within two hop range of the type C device. Type B device 4 only includes 11 indicator bits as it is always out of range, or only within a three hop range of the type C device.

It will be apparent to those skilled in the art that various modifications and variations can be made to the invention without departing from the spirit or scope of the invention. Thus, it is intended that the present invention covers the modifications and variations of this invention provided they come within the scope of the appended claims and their equivalents.

What is claimed is:

1. A first safety radio used in a vehicular wireless environment comprising an indicator bit field to enable the discovery of a second safety radio, configured such that the interoperability in the case of the first safety radio switching between safety and control channels in a first vehicle with the second safety radio that is safety only enabled in a second vehicle is assured.

2. The first safety radio as in claim 1 for transmitting safety information during a safety channel interval.

3. The first safety radio according to claim 1 wherein a zero value of the indicator bit field indicates a zero hop condition to a safety and non-safety enabled radio.

4. The first safety radio according to claim 1 wherein a non-zero value of the indicator bit field indicates the minimum number of hops to a safety and non-safety enabled radio.

5. The first safety radio according to claim 1 wherein an "all-ones" value of the indicator bit field indicates that a safety and non-safety enabled radio is not discovered or at a maximum distance.

6. The first safety radio according to claim 1 wherein the indicator bit field comprises two bits.

7. The first safety radio according to claim 6 wherein an indicator bit field value of 00 indicates a type C (safety and non-safety enabled) device.

8. The first safety radio according to claim 6 wherein an indicator bit field value of 01 does not indicate a type C (safety and non-safety enabled) device but is within one hop to a closest type C device.

9. The first safety radio according to claim 6 wherein an indicator bit field value of 10 does not indicate a type C (safety and non-safety enabled) device but is within two hops to a closest type C device.

10. The first safety radio according to claim 6 wherein an indicator bit field value of 11 does not indicate a type C (safety and non-safety enabled) device but is within three hops or more to a closet type C device.

11. The first safety radio according to claim 1 comprising a type B (safety only enabled) radio.

12. The first safety radio according to claim 1 comprising a type C (safety and non-safety enabled) radio.

13. A detection method in a vehicular wireless environment comprising using an indicator field in type B devices (safety enabled) and in types C device (safety and non-safety enabled) so that either the type B device or the type C device can give warnings to another type B device in the proximity that a type C device is likely approaching.

14. The detection method of claim 13 further comprising a first indicator field value for announcing a type C device.

15. The detection method of claim 13 further comprising a second indicator field value for announcing a one-hop type C device condition.

16. The detection method of claim 13 further comprising a third indicator field value for announcing a two-hop type C device condition.

17. The detection method of claim 13 further comprising a fourth indicator field value for announcing a three-hop or more type C device condition.

18. A detection method in a vehicular wireless environment comprising using an indicator field having first, second, third, and fourth values in type B devices (safety enabled) and in types C device (safety and non-safety enabled) so that either the type B device or the type C device can give warnings to another type B device in the proximity that a type C device is likely approaching.

* * * * *

UNITED STATES PATENT AND TRADEMARK OFFICE
CERTIFICATE OF CORRECTION

PATENT NO. : 8,630,599 B2  
APPLICATION NO. : 13/044170  
DATED : January 14, 2014  
INVENTOR(S) : Wendong Hu et al.

Page 1 of 1

It is certified that error appears in the above-identified patent and that said Letters Patent is hereby corrected as shown below:

In the Specification

Column 7, line 12, "closet" should be --closest--

Signed and Sealed this  
Seventeenth Day of June, 2014

Michelle K. Lee  
*Deputy Director of the United States Patent and Trademark Office*